United States Patent
Kasai et al.

(10) Patent No.: US 6,592,795 B2
(45) Date of Patent: Jul. 15, 2003

(54) CONTINUOUS FORMING METHOD AND DEVICE FOR H-SHAPED FRP MEMBER

(75) Inventors: Toru Kasai, Tokyo (JP); Kazumi Asari, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/755,024

(22) Filed: Jan. 8, 2001

(65) Prior Publication Data
US 2001/0007684 A1 Jul. 12, 2001

(30) Foreign Application Priority Data
Jan. 11, 2000 (JP) ........................ 2000-002437

(51) Int. Cl.$^7$ ............................ B32B 17/04
(52) U.S. Cl. ............... 264/241; 264/339; 425/505; 425/509; 425/514; 425/518; 425/520; 425/328; 425/89; 156/180; 156/200
(58) Field of Search ................ 425/505, 508, 425/509, 510, 514, 518, 526, 328, 366, 89; 156/166, 180, 200, 199, 214, 467, 463; 264/241, 248, 339

(56) References Cited

U.S. PATENT DOCUMENTS

| | | | |
|---|---|---|---|
| 2,779,388 A | | 1/1957 | Quoss ...................... 264/37.18 |
| 2,822,575 A | * | 2/1958 | Imbert et al. ................ 156/185 |
| 2,977,630 A | * | 4/1961 | Bazler ........................ 156/180 |
| 3,649,407 A | * | 3/1972 | Markus ....................... 156/145 |
| 4,151,030 A | * | 4/1979 | Hensel ........................ 156/158 |
| 4,151,031 A | * | 4/1979 | Goad et al. .................. 156/201 |
| 4,816,102 A | * | 3/1989 | Cavin et al. ................. 156/180 |
| 4,980,013 A | * | 12/1990 | Lowery ....................... 100/232 |
| 5,043,128 A | | 8/1991 | Umeda ........................ 264/258 |
| 5,066,349 A | * | 11/1991 | Perko et al. ................. 156/166 |
| 5,127,980 A | * | 7/1992 | Cavin ......................... 156/180 |
| 5,192,383 A | * | 3/1993 | Cavin ......................... 156/166 |

FOREIGN PATENT DOCUMENTS

DE      2165470      12/1971

OTHER PUBLICATIONS

Patent Abstracts of Japan vol. 014, No. 311 (M–0994), Jul. 4, 1990 & JP 02 102029 A (JAMCO Corp), Apr. 13, 1990.

* cited by examiner

Primary Examiner—Robert Davis
Assistant Examiner—Joseph S. Del Sole
(74) Attorney, Agent, or Firm—Armstrong, Westerman & Hattori, LLP

(57) ABSTRACT

A continuous forming method and device for an H-shaped FRP member for forming semi-hardened preimpregnated members produced by impregnating thermosetting resin to carbon fiber or glass fiber and the like into a predetermined H-shape. The forming device comprises of a device for mounting a plural number of bobbins having strip-shaped preimpregnated material spooled thereto, providing tension when pulling the impregnated material out from the bobbin. The device the shapes the preimpregnated material to a predetermined H-shape that feeds release films from four sides of upper, lower, left and right. The device then provides heat and pressure to the preimpregnated material from said four sides with a heating furnace for after-curing the preimpregnated material. The device then hauls and holds the preimpregnated material for cutting the cured product.

4 Claims, 10 Drawing Sheets

CONTINUOUS FORMING METHOD AND DEVICE FOR H-SHAPED FRP MEMBER

FIELD OF THE INVENTION

The present invention relates to a forming device of a preimpregnated material produced by impregnating thermosetting resin to carbon fiber or glass fiber and the like.

DESCRIPTION OF THE RELATED ART

A technique for utilizing preimpregnated material produced by impregnating thermosetting resin such as epoxy resin and phenolic resin to long fiber such as carbon fiber and glass fiber to form a product having the desired cross-sectional shape by heating and forming the material is known. Since carbon fiber and glass fiber have great strength, especially tensile strength, per unit weight, a composite material formed by laminating fiber material with the fibers oriented in vertical, horizontal and diagonal directions can be used to manufacture products having light weight and relatively high strength and elasticity. Therefore, the material is widely utilized in forming aircraft and other industrial products.

The material used for forming the desired shape can be manufactured by arranging carbon fiber or glass fiber impregnated with thermosetting resin in parallel orientation to form one layer, by using fabric produced from these fibers to form one layer, or by laminating a plural number of such layers, further positioning roving of these fibers between layers if necessary to produce the forming member. The forming method and forming device of this material includes feeding plural strip-shaped preimpregnated materials from bobbins, heating and pressurizing the material by heated upper and lower molds of a hot press device to form a predetermined cross-sectional shape, an then curing the formed product in a curing furnace and completing the product. During the above-mentioned forming steps, the product is continuously pulled (hauled) by a haulage device mounted to the downstream side in the forming device so as to convey the product in the forming device.

However, the problems of the conventional forming method and device explained above is that notable friction resistance is generated when pulling the formed product by the haulage device, causing abrasion such as cutting or curling of the fiber. Furthermore, since the hauling force of the haulage device is strong, it is difficult according to the conventional method and device to form a thin product. Therefore, in order to solve these problems, the present applicants proposed, in Japanese Patent Laid-Open Application No. 2-102029, a device for intermittently transmitting strip-shaped preimpregnated material while bending the material with a mold so as to form a channel-shaped cross section, and hot-pressing the material to form a product with the desired shape. The device enables to continuously form structural members having linear trajectory with L-shaped or U-shaped cross section. The forming device of this kind is also disclosed in the specification of U.S. Pat. No. 4,151,031.

SUMMARY OF THE INVENTION

The present invention provides a device for efficiently forming H-shaped members made of FRP with advanced performance that can be used for underfloor beam member or reinforcement of main and tail planes of an aircraft.

The continuous forming device of an H-shaped FRP member according to the present invention comprises a device for mounting a plural number of bobbins having strip-shaped preimpregnated material produced by impregnating thermosetting resin to carbon fiber or glass fiber and the like spooled thereto, a device for providing tension when pulling the preimpregnated material out from the bobbin, a device for shaping the preimpregnated member to a predetermined H-shape, a device for feeding release films from four (upper, lower, left and right) sides, a press device for providing heat and pressure to the preimpregnated member from four sides, a heating furnace for after-curing the preimpregnated member, a device for hauling and holding the preimpregnated member, and a device for cutting the cured product to predetermined lengths.

Further, the device for shaping the strip-shaped preimpregnated member provided from the bobbins to form a predetermined H-shape comprises a device for forming two creases to two sheets of preimpregnated material in the longitudinal direction, a device for bending the sheet at the creases to form an open-trapezoid-shaped cross section, and a device for forming a U-shaped cross section and further superposing two U-shaped preimpregnated members to form an H-shape.

Moreover, the haulage device is interlocked with upper, left and right molds of the press device so that the preimpregnated member is heated and pressed for a predetermined time before being hauled for a predetermined length, and the press device is equipped with means for controlling the sequence for opening and closing the upper, left and right molds.

DETAILED DESCRIPTION OF PREFERRED EMBODIMENTS

Figure 1:
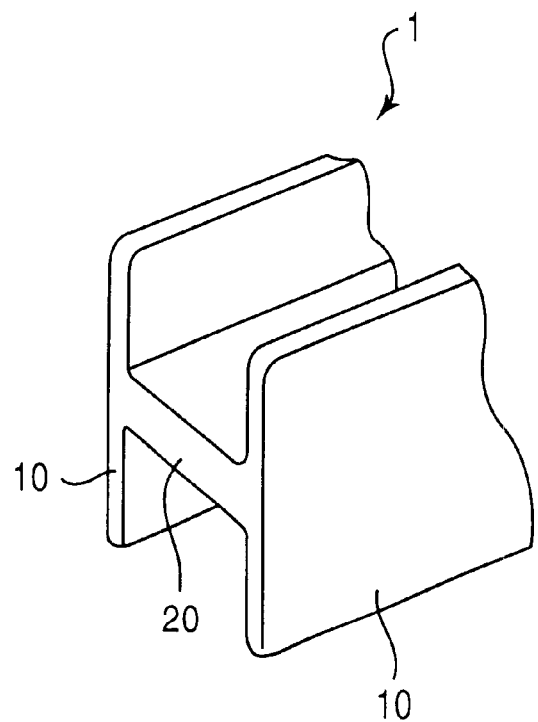
FIG. 1 is a perspective view showing the exterior of the H-shaped member.
Figure 2:
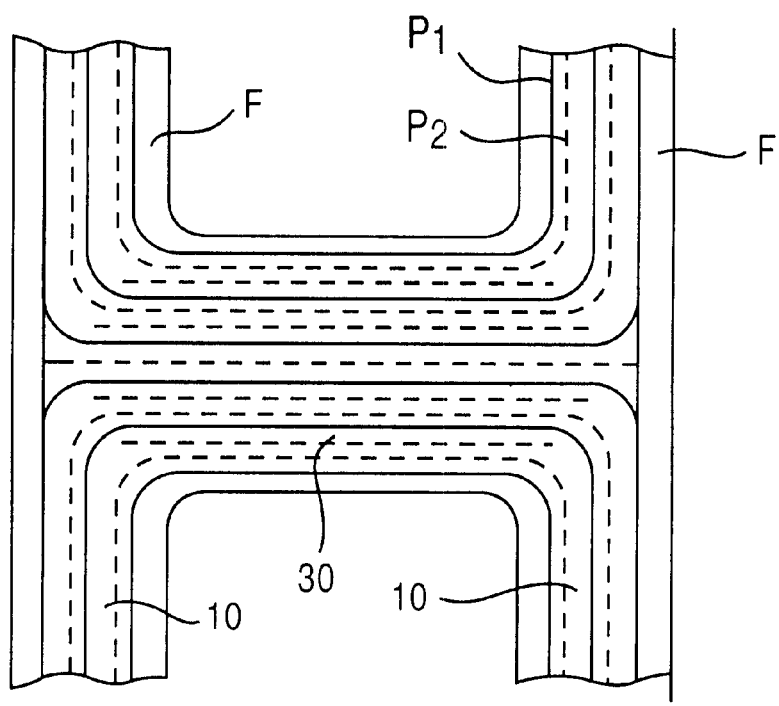
FIG. 2 is a cross-sectional view of the H-shaped member.

FIG. 1 is a perspective view showing the appearance of the H-shaped member formed according to the present invention, and FIG. 2 is a cross-sectional view thereof.

The H-shaped member shown as a whole by reference number 1, comprising both side walls 10, 10 and a rib 20 that connects the center area of the side walls, is manufactured by heat-forming a preimpregnated material, which is made by impregnating thermosetting resin to FRP (fiber reinforced plastics: plastic material reinforced with carbon fiber or glass fiber and the like).

The H-shaped member 1 is formed by laminating a plurality of preimpregnated members P1, P2, and a surface member P3. The preimpregnated member P1 is formed for example by alternately laminating preimpregnated sheets, the orientation of the fiber in each sheet arranged at an angle of 45 degrees to the longitudinal direction of the member. The preimpregnated member P2 is formed by laminating preimpregnated materials having fiber arranged in one direction. By selecting the orientation of the fiber appropriately, the H-shaped member can be formed to provide the most appropriate strength required for various applications. During the forming process, a release film F is superposed on the upper surface, the lower surface and both side surfaces of the member.

Figure 3:
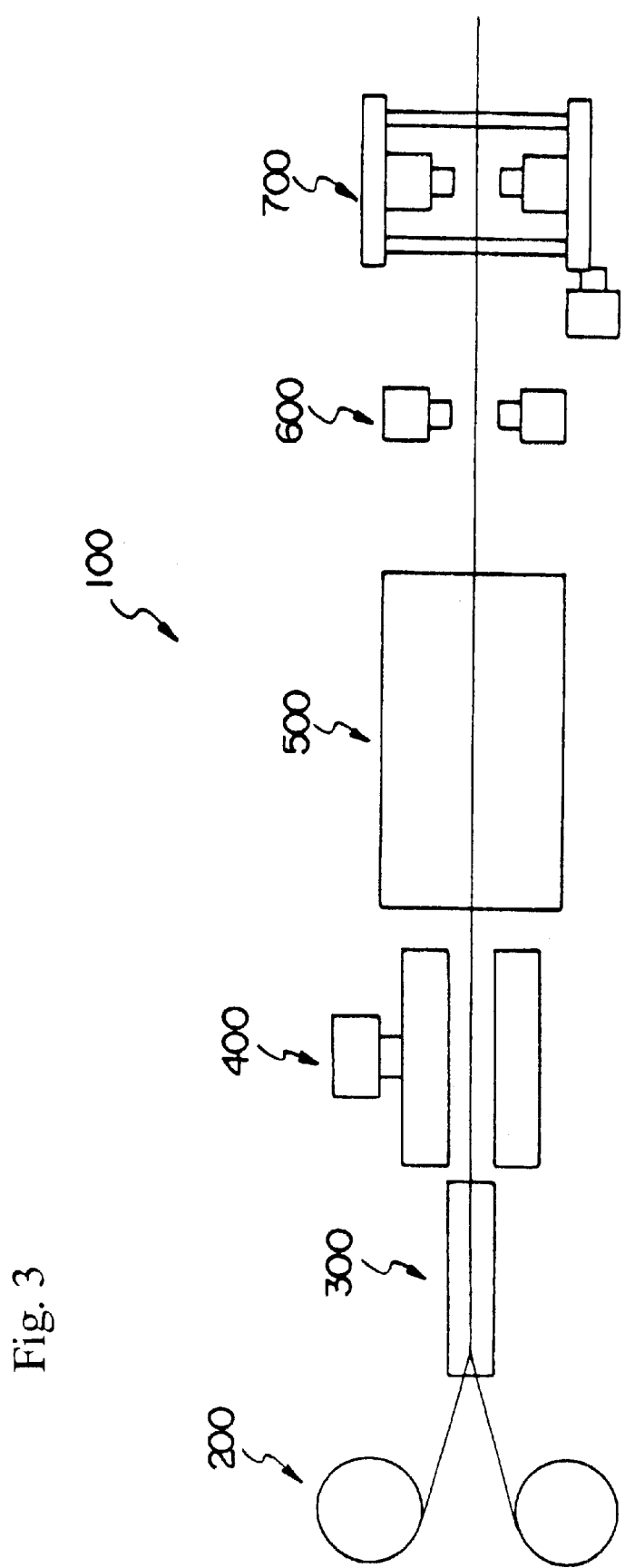
FIG. 3 is an explanatory view showing the outline of the continuous forming device of the H-shaped member.

FIG. 3 shows an outline of the continuous forming device according to the present invention.

The forming device shown as a whole by reference number 100 is equipped with a sheet-type material supply device 200, a forming device 300 for bending the sheets to form an H-shape, a hot press device 400, an after-cure device 500 which is a heating furnace, a sheet clamping (holding) device 600, and a sheet haulage device 700.

An appropriate cutter not shown is equipped downstream from the sheet haulage device 700 for cutting the product to appropriate lengths.

Figure 4:
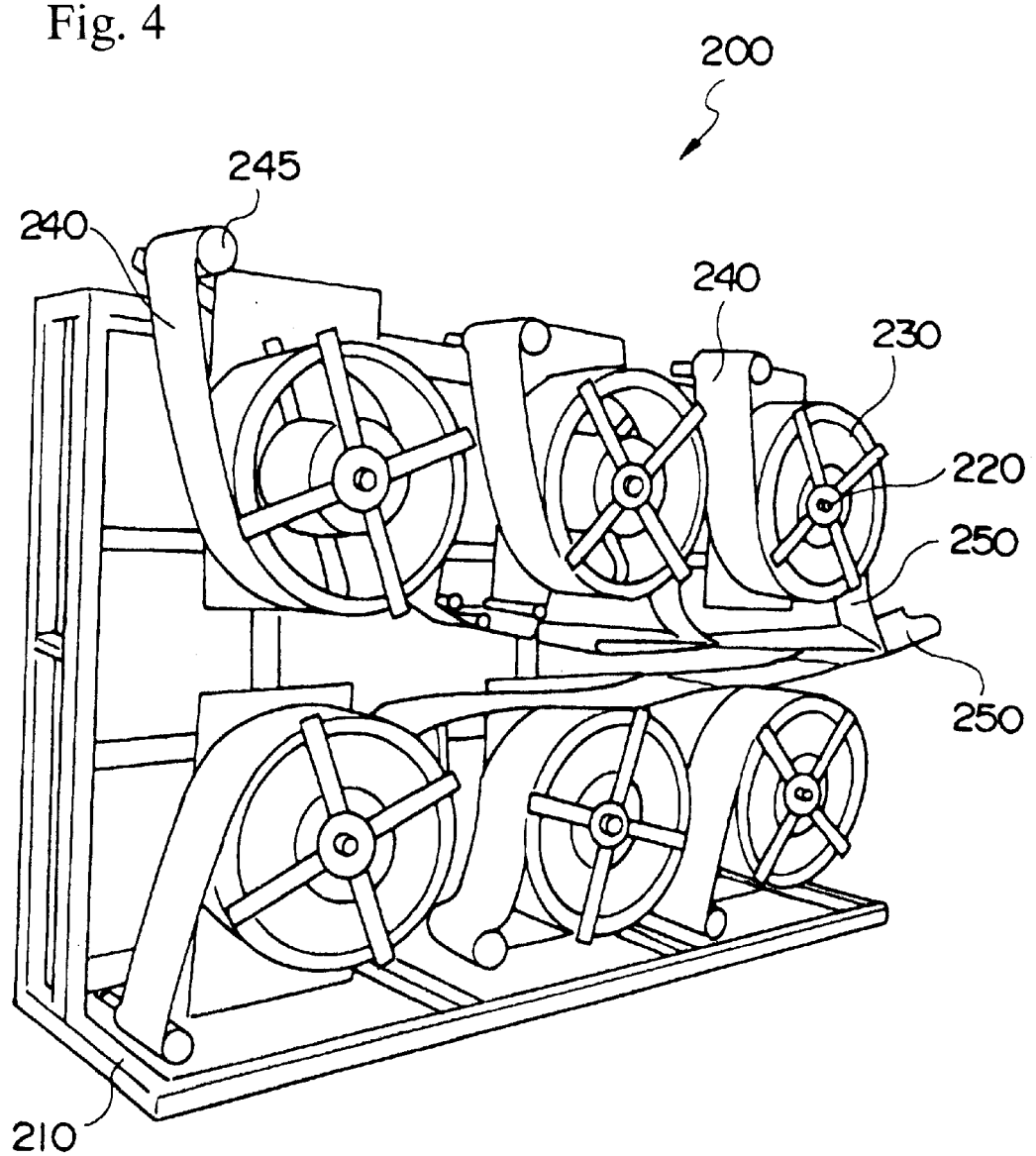
FIG. 4 is a perspective view showing the material feeding device in the continuous forming device of the H-shaped member.

FIG. 4 is a perspective view showing the details of the material supply device 200.

The material supply device 200 comprises a spindle 220 mounted on a stand 210, and a bobbin 230 is rotatably mounted thereto. A preimpregnated sheet 250 with a release film 240 laminated thereto is spooled onto the bobbin 230. Since the preimpregnated sheet 250 is tacky, it is spooled together with a release film 240, and the release film 240 is removed from the surface of the preimpregnated sheet 250 at the time the sheet is supplied to the forming device.

The release film 240 is removed and spooled by an appropriate reel device 245.

Six bobbins 230 are shown according to the present invention, but the number of the bobbins should be selected appropriately according to the specification of the H-shaped member to be formed. Moreover, release films are provided to the upper and lower surfaces of the sheet material.

Figure 5:
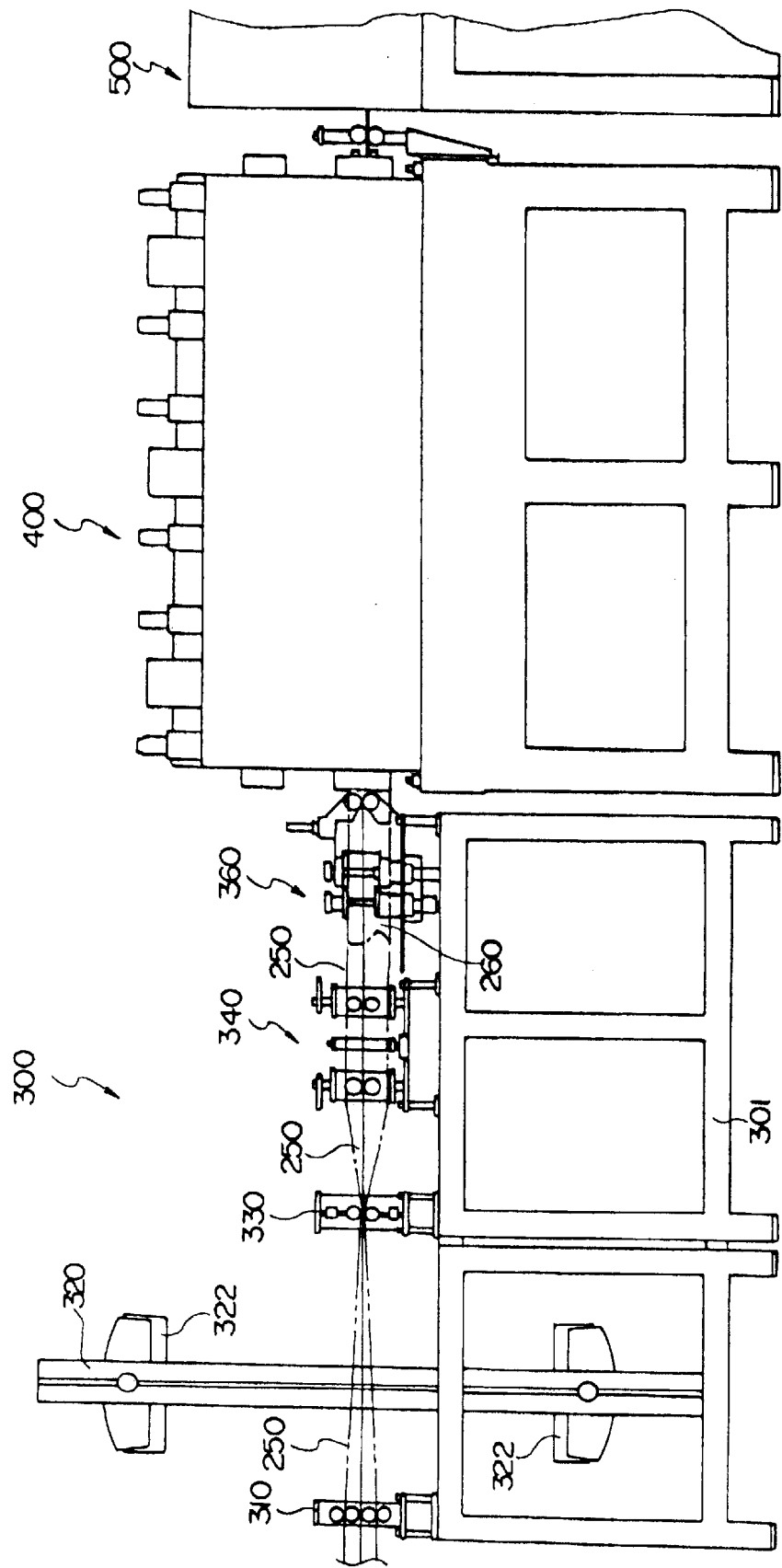
FIG. 5 is an explanatory view showing the step for forming the material to the shape of an H.

FIG. 5 shows devices for forming the provided preimpregnated sheet member 250 to the shape of an H, and to transmit the shaped member to a hot press and an after-cure device.

The device 300 for bending the sheet members 250 to form an H is equipped with a device 310 for providing creases to the sheet members 250, an infrared heater 320, a device 330 for bending the sheet members to form an open-trapezoid-shape, a device 340 for bending the sheet members 250 to form a U-shape, and a device 360 for laminating release films 260 to the side walls of the H-shaped sheet materials 250.

The formed preimpregnated sheet material is heated and pressure-formed in a hot press device 400, before being transmitted to an after-cure device 500.

Figure 6:
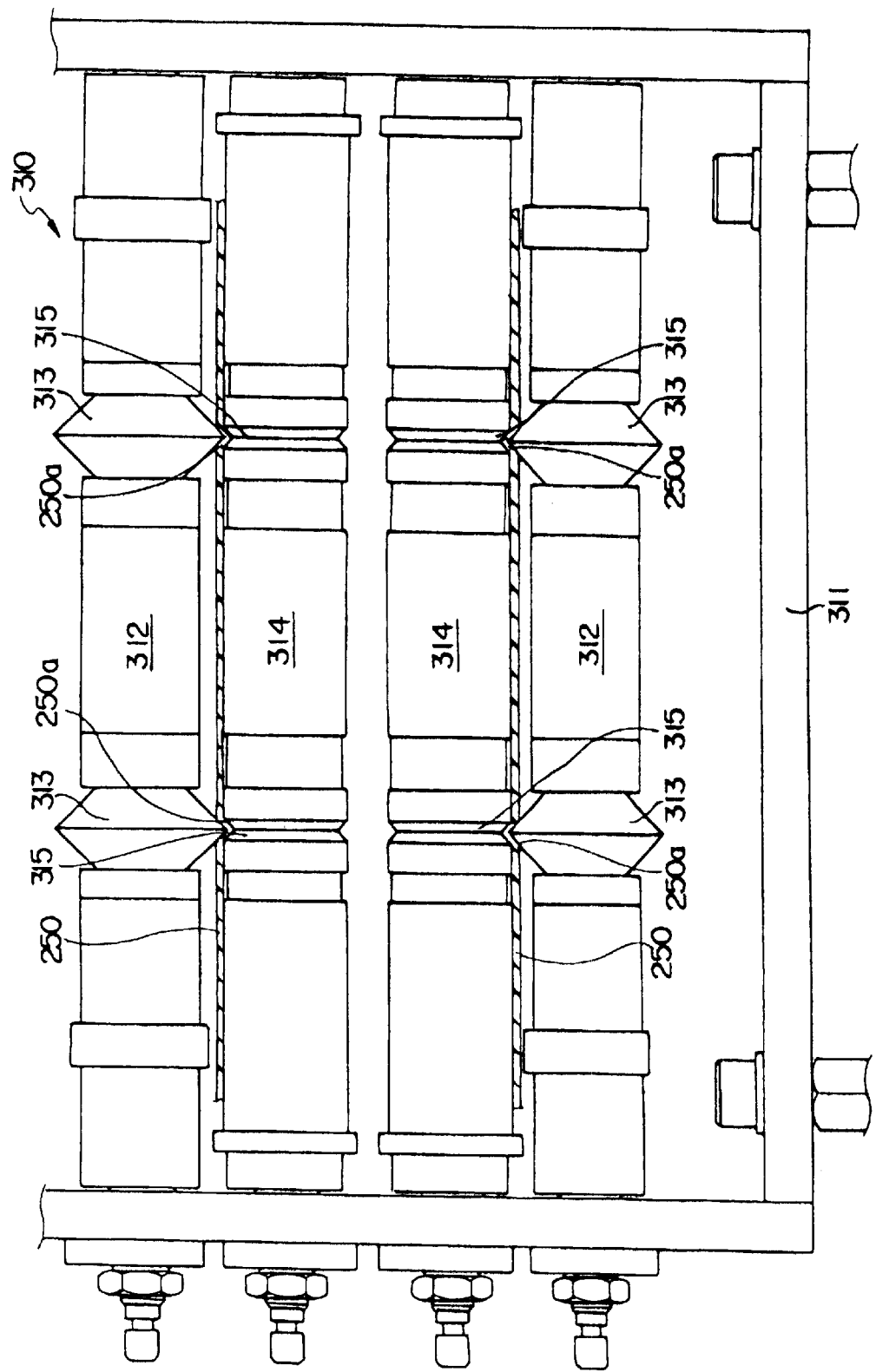
FIG. 6 is an explanatory view of the crease forming device.

FIG. 6 shows a crease-forming device 310, wherein two rolls 312 and 314 placed to face one another on a frame 311 is formed as a unit, and two units are equipped on the frame with one unit placed above the other.

The first roll 312 comprises protruded regions 313 having the shape of abacus beads, and the second roll 314 comprises groove regions 315 for receiving the protruded regions 313.

When traveling between the rolls 312 and 314, the sheet members 250 are provided with creases 250a.

The sheet members 250 provided with creases 250a are then fed to the open-trapezoid-shape forming device 330.

At this stage, the sheet members 250 travel through an infrared heater 320, which provides appropriate flexibility to the sheet members. The infrared heater 320 is equipped with heater units 322 placed above and under the sheet members 250.

Figure 7:
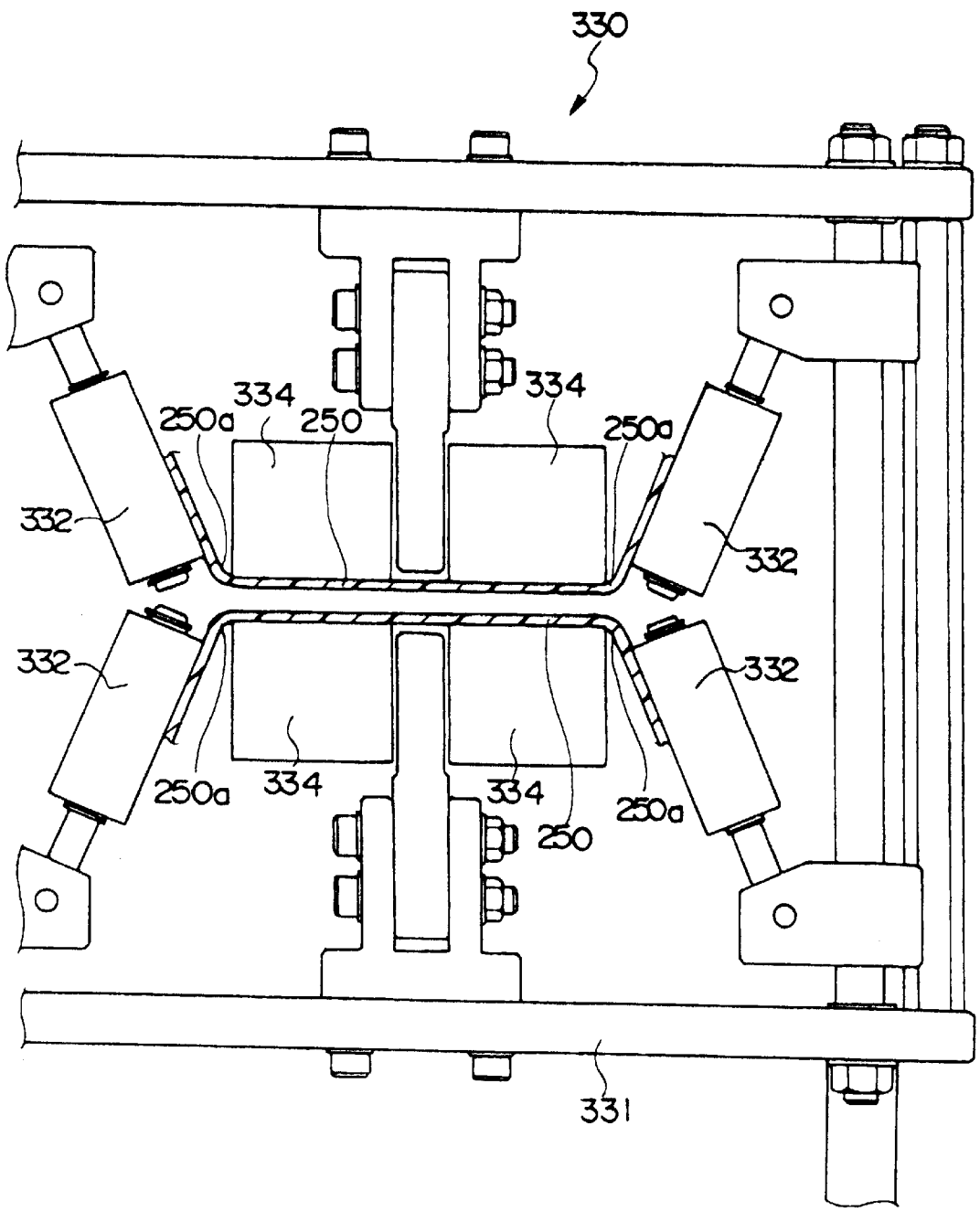
FIG. 7 is an explanatory view showing the open-trapezoid-shape forming device.

The open-trapezoid-shape forming device 330 shown in FIG. 7 comprises a frame 331 supporting rolls 334 having horizontal rotation axes and rolls 332 having tilted rotation axes, for bending the sheet members 250 traveling therethrough to form an open-trapezoid shape with the creases 250a positioned inward.

Figure 8:
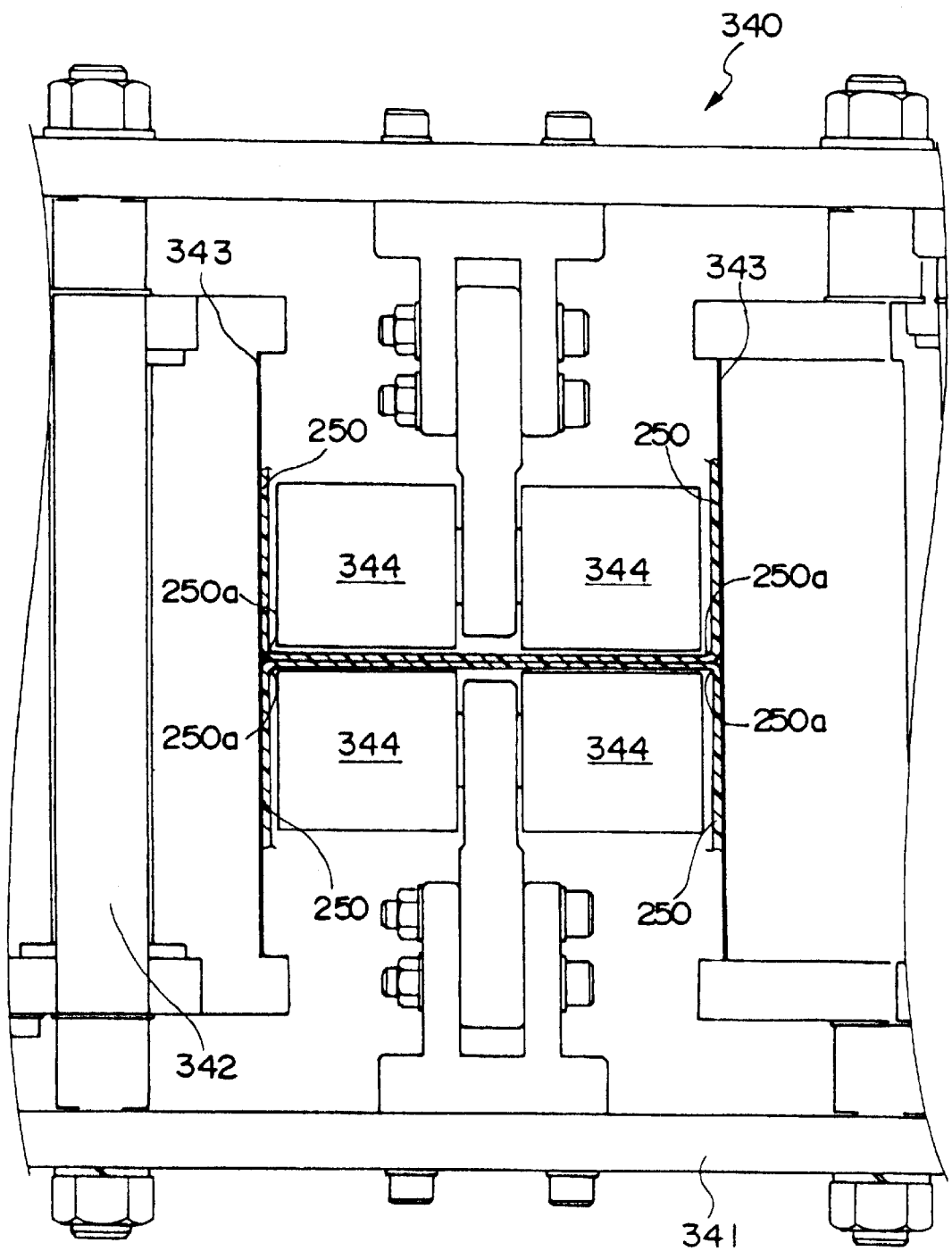
FIG. 8 is an explanatory view showing the U-shape forming device.

The sheet materials 250 each bent to form an open-trapezoid shape is then conveyed to the U-shape forming device 340 shown in FIG. 8. The U-shape forming device 340 comprises belts 343 rotatably supported by axes 342 perpendicularly mounted on a frame 341, and rolls 344 rotatably supported by horizontal axes.

When the open-trapezoid shaped sheet members 250 conveyed to the device 340 travel between the belts and rolls, each member is bent into a U-shape, and the two U-shaped sheets 250 are mutually fixed in the inverse direction to form an H-shape.

Next, release films 260 are laminated on both side surfaces of the H-shaped member at the station 360 before it is conveyed to the hot press device 400.

Figure 9:
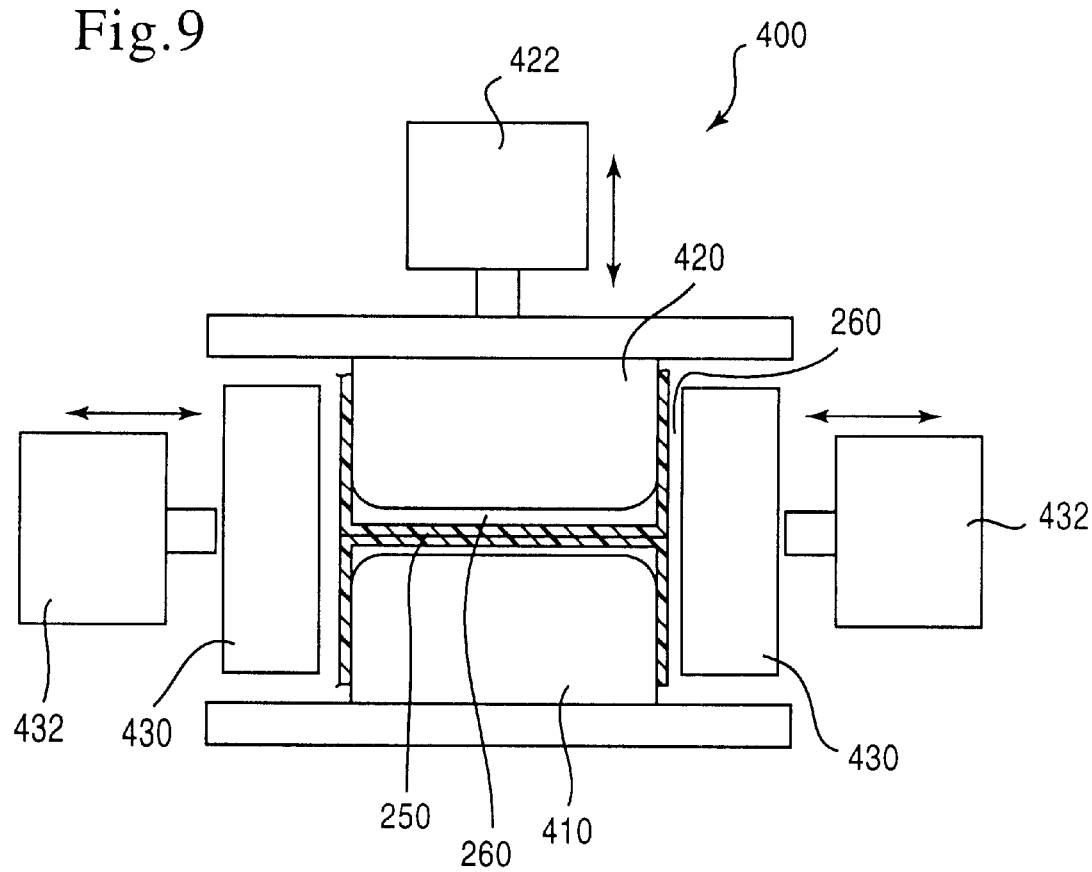
FIG. 9 is an explanatory view showing the mold structure of the hot press device.

FIG. 9 is an explanatory view showing the mold structure of the hot press device 400.

The hot press device 400 is equipped with a lower mold 410 and an actuator 422 for driving an upper mold 420 opposing to the lower mold 410. On both side areas of the upper and lower molds are positioned side molds 430 that are driven by actuators 432.

The after-cure device 500 is a heating furnace for heating the H-shaped and pressed preimpregated sheet member at a predetermined temperature for a predetermined time, in order to accelerate the thermosetting of the resin.

Figure 10:
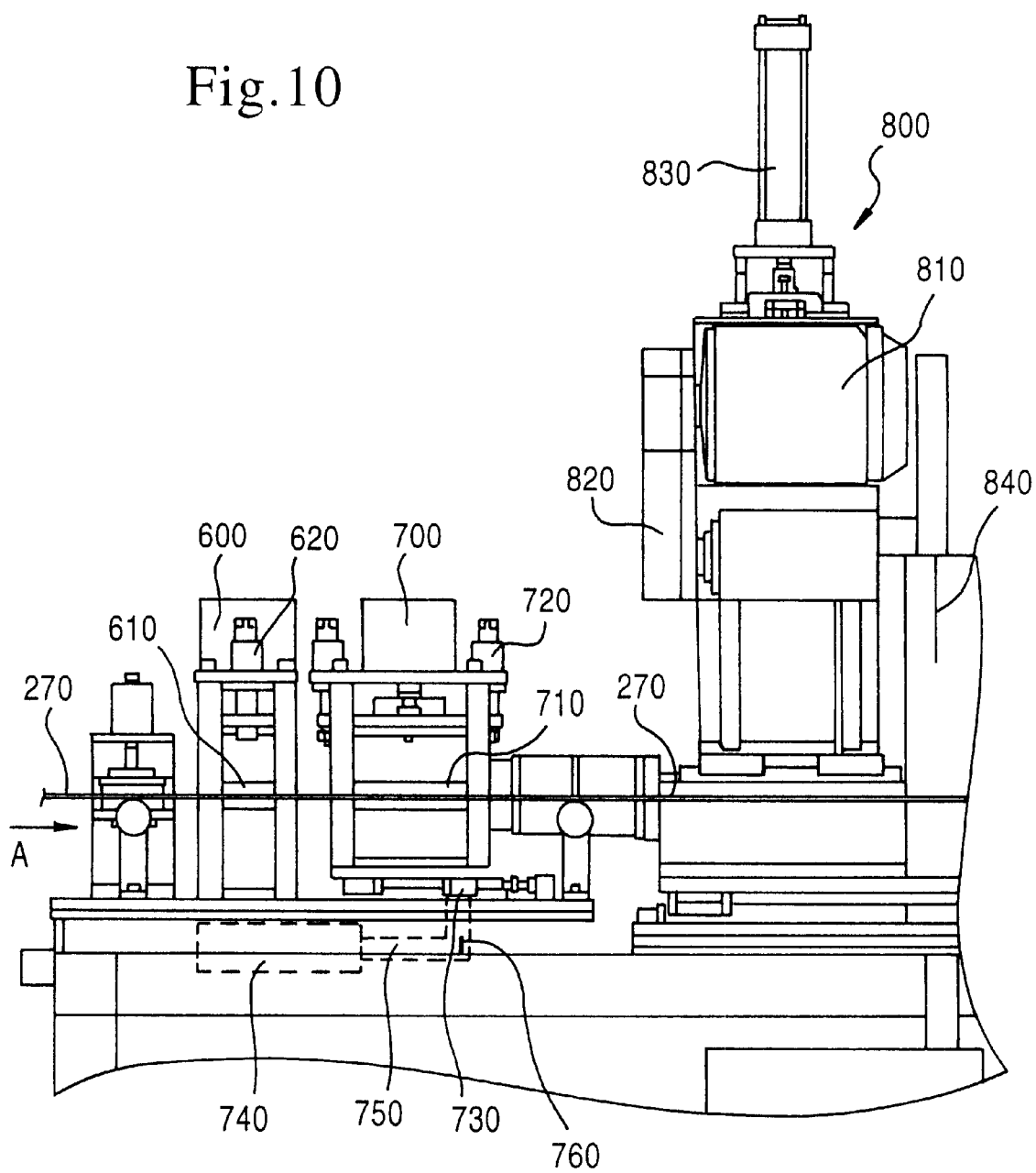
FIG. 10 is an explanatory view showing the haulage device and the cutting device of the sheet material.

FIG. 10 is an explanatory view showing the clamp of the sheet material mounted near the output of the after cure device 500, a haulage device, and a cutting device.

The H-shaped member 270, in other words, the product that has completed the curing process by the after-cure device 500, passes through the product clamping device 600 and the haulage device 700.

The clamping device 600 is equipped with a clamping means 610 for gripping the product 270 with an actuator 620, and while the haulage device 700 is not operated, the clamping means constantly holds the product 270. Since the area near the bobbin feeding the preimpregnated sheet material 250 is provided with a driving force that constantly pulls the preimpregnated sheet 250 back toward the bobbin so that tension is constantly provided to the sheet material 250 during the forming process, the clamping means prevents the product from being pulled back toward the bobbin by the tension.

The haulage device 700 is equipped with a gripper 710 that grips the product 270 through the operation of the actuator 720, and the device 700 is slidably supported by a linear guide 730.

The cylinder 740 drives the piston rod 750, and the piston rod 750 drives the feeding device toward the arrow A direction through a connecting unit 760. By the operation of the haulage device 700, the product 270 is hauled and conveyed intermittently.

The cutting device 800 comprises a rotary cutting blade 840 that is driven by a motor through a transmission 820, and through the actuator 830, the rotary cutting blade 840 descends and separates the product 270.

When the product 270 formed into a strip-shape reaches a predetermined length, the cutting device 800 is activated and the product 270 is cut into predetermined sizes.

For example, by detecting the position of the front end of the product 270 using a proximity switch and the like for activating the cutting device, the separating of the products 270 can be performed automatically.

Figure 11:
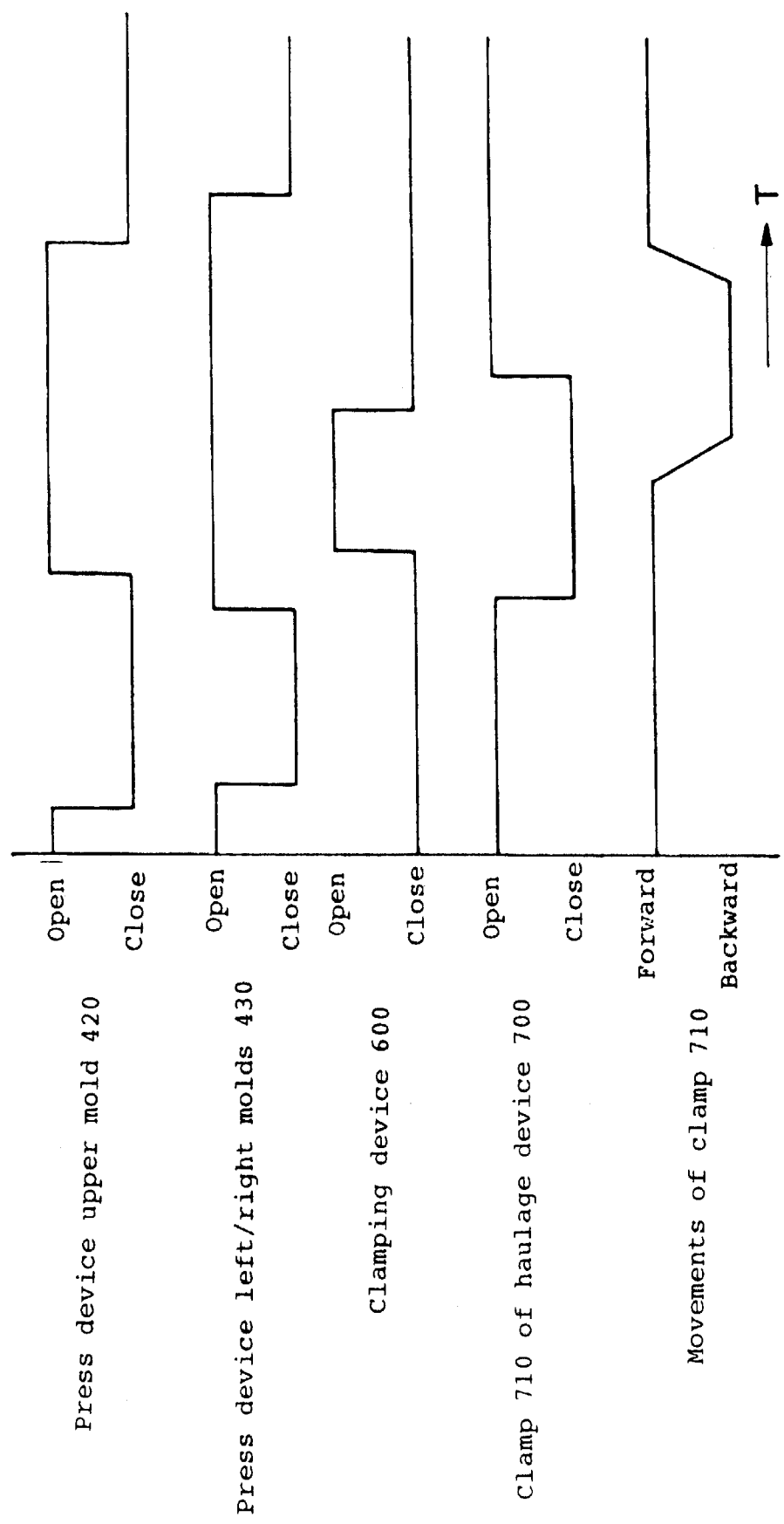
FIG. 11 is a chart showing the sequence of operation of the present device.

FIG. 11 is a drawing showing the operational sequence of the hot press device 400, the clamping device 600, and the feeding (haulage) device 700.

The upper mold of the press is closed before the left and right side molds of the press are closed, and the product is held in this position for a predetermined time, thereby completing the hot press process.

During this time, the clamping device 610 of the product is closed, maintaining grip of the product.

After holding the product by closing the haulage device and the clamping device 710, the cylinder 740 is driven to move the clamping device 710 so as to convey the product 270.

Furthermore, the haulage device and the clamping device described in the above-mentioned preferred embodiment are merely one example of devices that can be used in the present invention, and any appropriate device for hauling and gripping the product, such as those using rollers or caterpillars, can also be used.

As explained, the present invention enables to form H-shaped members made of FRP continuously and automatically.

We claim:

1. A process for continuously forming flat sheets of thermosetting resin impregnated with carbon and/or glass fiber with the exterior surface protected by a first release film into an H-shaped FRP material, said process comprising:

hauling and holding said flat sheets of thermosetting resin progressively throughout the process;

removing said first release film from the flat sheets of thermosetting resin;

providing a second release film to the upper surface of a top flat sheet and to the lower surface of a bottom flat sheet of said flat sheets of thermosetting resin;

shaping said flat sheets of thermosetting resin to a pre-determined H-shape;

providing a third release film to the left and right exterior side surfaces of the H-shaped FRP material;

providing heat and pressure to the exterior surface of said H-shaped FRP material;

providing heat for after-curing of said H-shaped FRP material; and cutting the H-shaped FRP material.

2. An apparatus for continuously forming flat sheets of thermosetting resin impregnated with carbon and/or glass fiber with the exterior surface protected by a first release film into an H-shaped FRP material, said apparatus comprising:

a means for hauling and holding said flat sheets of thermosetting resin progressively throughout the process;

a means for removing said first release film from the flat sheets of thermosetting resin;

a means for providing a second release film to the upper surface of a top flat sheet and to the lower surface of a bottom flat sheet of said flat sheets of thermosetting resin;

a means for shaping said flat sheets of thermosetting resin to a pre-determined H-shape;

a means for providing a third release film to the left and right exterior side surfaces of the H-shaped FRP material;

a means for providing heat and pressure to the exterior surface of said H-shaped FRP material;

a means for providing heat for after-curing of said H-shaped FRP material; and a means for cutting the H-shaped FRP material.

3. The apparatus of claim 2, wherein said means for shaping flat sheets of thermosetting resin to a pre-determined H-shape is comprised of:

a means for forming two creases to two of said flat sheets of thermosetting resin;

a means for bending said flat sheets of thermosetting resin at the point of said creases to form an open-trapezoid-shape cross section;

a means for forming a U-shaped cross section from said open-trapezoid-shape cross section; and a means for mutually fixing two U-shaped cross sections to form an H-shape cross section.

4. The apparatus of claim 2, wherein said means for hauling and holding is timed to haul and to hold said flat sheets of thermosetting resin at intermittent periods of time necessary for said means for providing heat and pressure to apply the necessary heat and pressure to form an H-shaped FRP material.

* * * * *